United States Patent
Yaman et al.

(10) Patent No.: US 12,482,238 B2
(45) Date of Patent: Nov. 25, 2025

(54) INSTANCE-AWARE REPEAT FACTOR SAMPLING METHOD FOR IMBALANCED DATA IN OBJECT DETECTION

(71) Applicant: Robert Bosch GmbH, Stuttgart (DE)

(72) Inventors: Burhaneddin Yaman, San Jose, CA (US); Chun Hao Liu, Redwood City, CA (US)

(73) Assignee: Robert Bosch GmbH, Stuttgart (DE)

( * ) Notice: Subject to any disclaimer, the term of this patent is extended or adjusted under 35 U.S.C. 154(b) by 360 days.

(21) Appl. No.: 18/189,679

(22) Filed: Mar. 24, 2023

(65) Prior Publication Data

US 2024/0320959 A1   Sep. 26, 2024

(51) Int. Cl.
 *G06V 10/774* (2022.01)
 *G06V 10/764* (2022.01)

(52) U.S. Cl.
 CPC .......... *G06V 10/774* (2022.01); *G06V 10/764* (2022.01)

(58) Field of Classification Search
 None
 See application file for complete search history.

(56) References Cited

U.S. PATENT DOCUMENTS

2022/0383037 A1\* 12/2022 Pham ...................... G06F 18/25

OTHER PUBLICATIONS

Gupta, Agrim, Piotr Dollar, and Ross Girshick. "Lvis: A dataset for large vocabulary instance segmentation." Proceedings of the IEEE/CVF conference on computer vision and pattern recognition. 2019.

\* cited by examiner

*Primary Examiner* — Leon Flores
(74) *Attorney, Agent, or Firm* — Brooks Kushman P.C.

(57) ABSTRACT

An approach for handling long-tail distribution with data imbalance. Disclosed embodiments improve Repeat Factor Sampling methods by considering both images and bounding boxes (i.e., instances) to generate improved sets of training data. Disclosed embodiments may be useful in image analysis domains, such as object detection and classification.

20 Claims, 4 Drawing Sheets

INSTANCE-AWARE REPEAT FACTOR SAMPLING METHOD FOR IMBALANCED DATA IN OBJECT DETECTION

TECHNICAL FIELD

The present invention relates to computer vision and image analysis, including the detection and classification of objects in images. Disclosed embodiments may be used to generate improved sets of training data for training classifiers.

BACKGROUND

Long-tail distribution with data imbalance in class distribution is an issue for many real-world applications. For example, long-tail distribution problems occur in the computer vision domain in areas such as image recognition, object detection, semantic segmentation, etc. Models (e.g., classifiers) may become biased towards major classes (i.e., classes with many training samples) during training. Achieving good performance on minor classes (i.e., classes with few training classes) may become increasingly difficult. To properly utilize all the available data as well as to reduce overfitting towards major classes, it may be necessary to incorporate optimization strategies.

SUMMARY

There are two approaches to solving problems associated with long-tail distribution in training sets. The first approach involves data augmentation with class-balanced sampling and the second approach involves using a modified loss function.

Data augmentation with class-balanced sampling involves up-sampling minor classes through data augmentation and down-sampling major classes. Such an approach may not properly exploit the available data representation of the major classes and the performance may be biased to the augmented minor classes. Utilization of long-tail instance balanced sampling and class-balanced sampling is a solution that can exploit the available data as well as achieve better performance on the minor classes. Nevertheless, in cases of significant imbalance between the major and minor classes, such an approach may require a much larger up-sampling and down-sampling ratio that may under-represent the major classes and makes the training become biased.

Modifying the loss function to handle the effect of large class imbalance involves adaptive weighting of the classes in the loss function to attempt to add more weights to the minor class predictions to handle the class imbalance. However, such an approach faces similar complications with large imbalance among classes. Grouping the predictions and loss functions according to the available samples of each class is another promising solution. Despite considerable improvement of performance, the larger imbalance of the dataset can significantly under-represent the minor classes that suffers from similar challenges since the optimization is carried out on the long-tailed data with a single-phase training.

Some disclosed embodiments focus on class-balanced sampling to solve class imbalance problems in object detection. Some disclosed embodiments describe methods of sampling a set of images to create a training set of images for training a classifier, comprising: for each class c of an object to be classified by a classifier, generating a value $f_{i,c}$ that is the fraction of images in the set of images including at least one bounding box of class c; for each class c of an object to be classified by the classifier, generating a value $f_{b,c}$ that is the fraction of bounding boxes of class c in the set of images; for each class c of an object to be classified by the classifier, combining $f_{i,c}$ and $f_{b,c}$ to generate a value $f_c$; and sampling the set of images in accordance with the value $f_c$ to generate the training set of images.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed embodiments may build on or improve a sampling method referred to as Repeat Factor Sampling ("RFS"). RFS is an effective method for sampling balanced images when training an object detection model. RFS increases the rate at which tail classes are observed by oversampling the images that contain the tail classes. By repeating images containing rare classes in each epoch, the method can be applied to long-tailed classification problems. However, RFS has deficiencies or problems associated with it.

Referring to RFS, for each class c, let $f_c$ be the fraction of training images that contain at least one instance of class c. Accordingly, a class-level repeat factor $r_c$ is defined as $$r_c = \max\left(1, \sqrt{\frac{t}{f_c}}\right),$$

where t is a hyperparameter. As each image may include a plurality of distinct classes, an image-level repeat factor $r_i$ is defined. More formally, for each image i, the image level repeat factor $r_i$ is defined as $r_i = \max_{c \in i} r_c,$ where $\{c \in i\}$ denotes the classes present in image i. During training, each image is repeated according to its repeat factor $r_i$. The hyperparameter t, is a threshold that intuitively controls the point at which oversampling begins. For classes with $f_c \geq t$, there is no oversampling.

Figure 1:
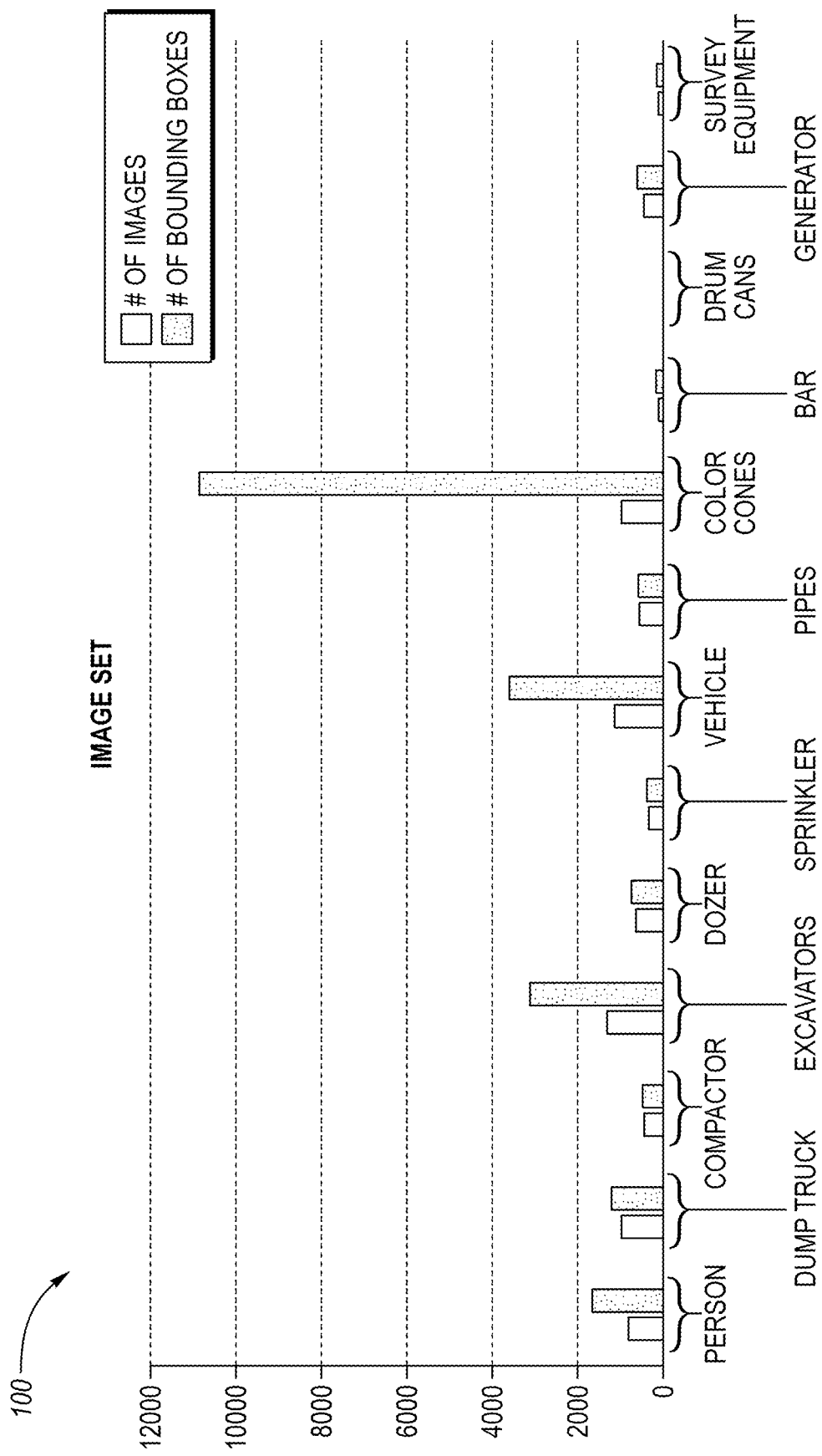
FIG. 1 discloses an example graph of a representation of an image set in accordance with disclosed embodiments.

A problem with RFS is that $f_c$ may not be representative, especially if there is an imbalance between the number of images versus number of bounding boxes. FIG. 1 may be used to illustrate this problem further. FIG. 1 depicts a graph 100 including a representation of a set of images with each image including one or more objects that may be found at a construction site. Table 1 illustrates the distribution of images and bounding boxes in the image set disclosed in FIG. 1. For example, Table 1 shows that there are 839 images in the image set that include at least one instance of a person. As shown in Table 1 there are 2219 images in the image set. Table 1 shows the $f_c$ ratio for each of the classes. For example, the ratio or fraction of images including at least one instance of a person is 0.3781 (839/2219=0.3781). FIG. 1 illustrates that color cone is the most frequent class in terms of instances. That is, color cone has the highest number of bounding boxes (i.e., instances). However, as seen in Table 1, the $f_c$ ratio regards the excavator as the most frequent class. Thus, a value $f_c$ that relies on only images does not thoroughly capture the information about rare or less frequent classes and tends to weight the rare and frequent classes similarly, which conflicts with the purpose of RFS.

TABLE 1

| Class | # of images | # bounding boxes | $f_c$ |
|---|---|---|---|
| Person | 839 | 1674 | 0.3781 |
| Dump Truck | 1001 | 1215 | 0.4511 |
| Compactor | 456 | 503 | 0.2055 |
| Excavators | 1349 | 3145 | 0.6079 |
| Dozer | 665 | 748 | 0.2997 |
| Sprinkler | 349 | 390 | 0.1573 |
| Vehicle | 1178 | 3639 | 0.5309 |
| Pipes | 574 | 604 | 0.2587 |
| Color Cones | 987 | 10872 | 0.4448 |
| Bar | 90 | 176 | 0.0406 |
| Drum Cans | 2 | 2 | 0.0009 |
| Generator | 451 | 636 | 0.2032 |
| Survey Equipment | 116 | 176 | 0.0523 |
| Total # of Images | 2219 | | |

Figure 2:
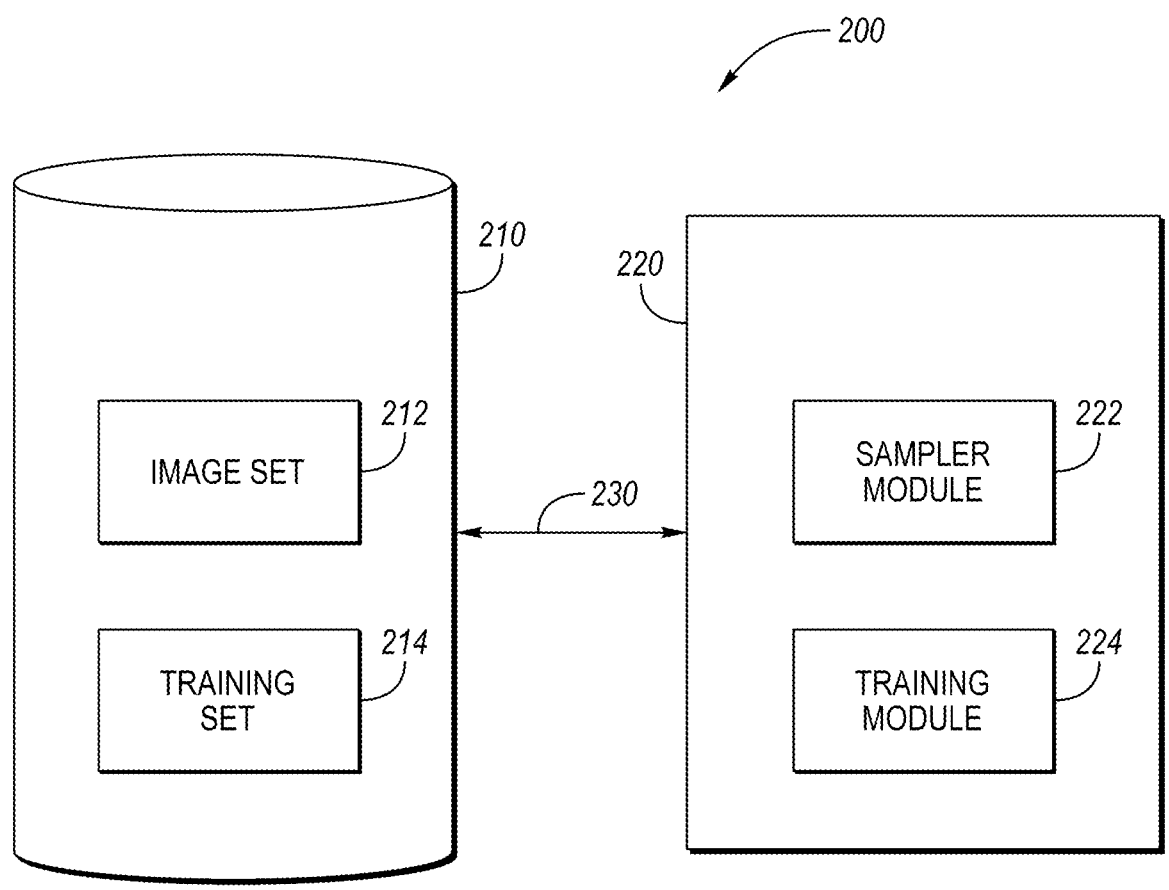
FIG. 2 discloses an example system for generating training sets in accordance with disclosed embodiments.

To address these problems of RFS and ensure the rare classes are prioritized in an RFS process, disclosed herein are embodiments of an instance-aware RFS ("I-RFS") that takes into consideration both image and bounding box. Referring to FIG. 2, disclosed embodiments may include a data store 210 and a computing system 220. The data store 210 may include an image set 212, such as the image set represented in FIG. 1. The data store 210 may also include a training set 214 derived from the image set 212 in accordance with disclosed embodiments. Data store 210 may be communicatively connected 230 to computer system 220 in a manner that allows computer system 220 to read data from data store 210 and to write data to data store 210. The computer system 220 may include a sampler module 222 including processor-executable instructions. The computer system 220 may execute the processor-executable instructions in the sampler module 222 to perform methods of disclosed embodiments that generate the training set 214. The computer system 220 may include a training module 224 including processor-executable instructions. The computer system 220 may execute the processor-executable instructions in the training module 224 to perform methods of disclosed embodiments that train a classifier on the training set 214.

Figure 3:
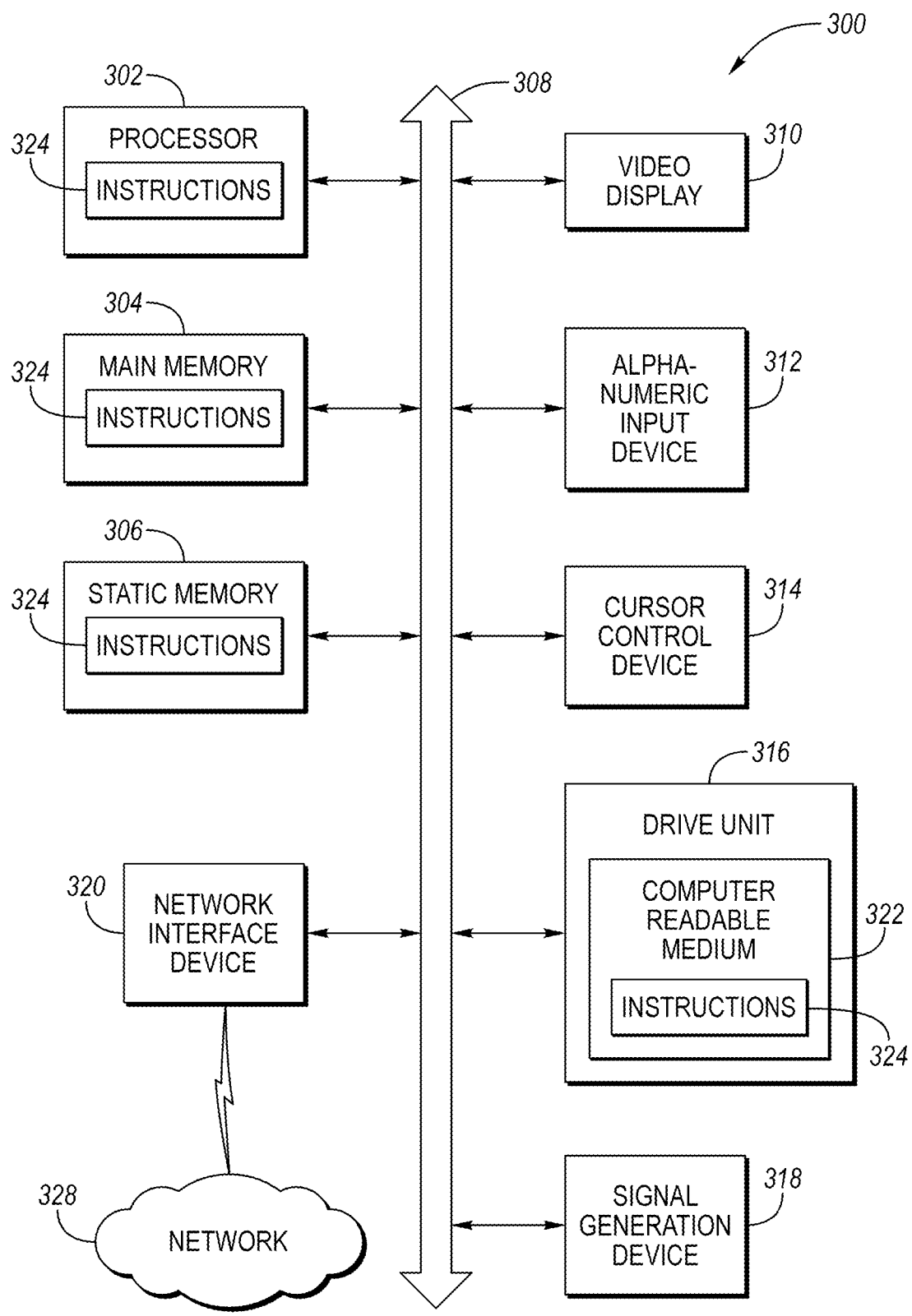
FIG. 3 discloses an example computing system in accordance with disclosed embodiments.

FIG. 3 shows a block diagram of an example embodiment of a general computer system 300. The general computer system 300 may be used as the computer system 220 shown in FIG. 2. The computer system 300 can include a set of instructions that can be executed to cause the computer system 300 to perform any one or more of the methods or computer-based functions of disclosed embodiments. For example, the computer system 300 may include executable instructions to perform functions of the sampler module 222 or training module 224. The computer system 300 may be connected to other computer systems or peripheral devices via a network. For example, the computer system 300 may be communicatively connected 230 to the data store 210 shown in FIG. 2. Additionally, the computer system 300 may include or be included within other computing devices.

As illustrated in FIG. 3, the computer system 300 may include one or more processors 302. The one or more processors 302 may include, for example, one or more central processing units ("CPU"), one or more graphics processing units ("GPU"), or both. The computer system 300 may include a main memory 304 and a static memory 306 that can communicate with each other via a bus 308. As shown, the computer system 300 may further include a video display unit 310, such as a liquid crystal display ("LCD"), a projection television display, a flat panel display, a plasma display, or a solid-state display. Additionally, the computer system 300 may include an input device 312, such as a remote-control device having a wireless keypad, a keyboard, a microphone coupled to a speech recognition engine, a camera such as a video camera or still camera, or a cursor control device 314, such as a mouse device. The computer system 300 may also include a disk drive unit 316, a signal generation device 318, such as a speaker, and a network interface device 320. The network interface 320 may enable the computer system 300 to communicate with other systems via a network 328. For example, the network interface 320 may enable a machine learning system to communicate with a database server (not show) or a controller in manufacturing system (not shown).

In some embodiments, as depicted in FIG. 3, the disk drive unit 316 may include one or more computer-readable media 322 in which one or more sets of instructions 324, e.g., software, may be embedded. For example, the instructions 324 may embody one or more of the methods or functionalities, such as the methods or functionalities of disclosed embodiments. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In some embodiments, dedicated hardware implementations, such as application specific integrated circuits, programmable logic arrays and other hardware devices, can be constructed to implement one or more of the methods or functionalities described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, embodiments of the present system encompass software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or functionalities of disclosed embodiments.

In some embodiments, some or all of the computer-readable media will be non-transitory media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium.

Figure 4:
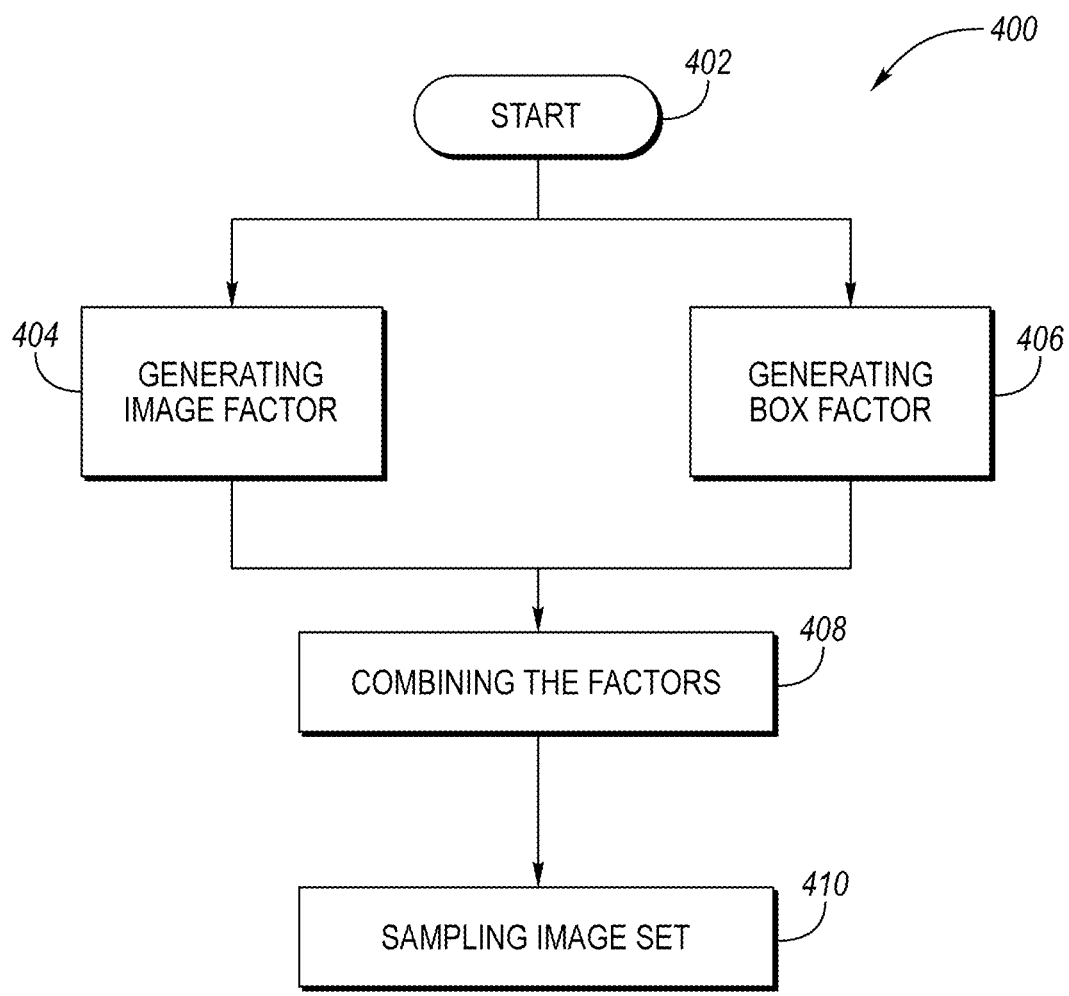
FIG. 4 discloses an example flowchart of a method in accordance with disclosed embodiments.

FIG. 4 discloses an example method 400 in accordance with disclosed embodiments. In some embodiments, the method 400 addresses the deficiencies in RFS described above by taking into consideration both the number of images including a class and the number of bounding boxes corresponding to a class (i.e., instances of a class). The method 400 may be referred to herein as an instance-aware RFS ("I-RFS"). In some embodiments, the method 400 may be used in object detection with imbalanced data.

The method 400 starts at operation 402. In some embodiments, operation 402 includes performing any initializations that are necessary for the method 400 to be performed. Such initializations may include loading all or part of a set of images into memory from a data store, such as loading all or part of the image set 212 from the data store 210. Initializations performed by operation 402 may include initializing parameters, such as initializing the hyperparameter t discussed above. In some embodiments, t is 0, 0.1, 0.01, 0.001, or 0.0001.

Upon completion of operation 402, two operations 404 and 406 are performed. Operations 404 and 406 may be performed sequentially or may be performed simultaneously. In operation 404, an image factor $f_{i,c}$ may be generated, for each class c of an object to be classified by a classifier to be trained using a training set generated by method 400. The image factor $f_{i,c}$ may denote the fraction of images in an image set (e.g., image set 212) that include at least one bounding box (i.e., at least one instance) of the class c. In operation 406, a box factor $f_{b,c}$ may be generated, for each class c of an object to be classified by the classifier. The box factor $f_{b,c}$ may denote the fraction of all bounding boxes that correspond to class c.

In operation 408, a value $f_c$ is generated for each class c of an object to be classified by the classifier. In some embodiments, the image factor $f_{i,c}$ and the box factor $f_{b,c}$ for a class c are combined to generate a value $f_c$ for the class c. In some embodiments, a mean of the image factor $f_{i,c}$ and the box factor $f_{b,c}$ is generated to produce a value $f_c$ for the class c. In some embodiments, a value $f_c$ for the class c may be a geometric mean generated according to the following:

$$f_c = \sqrt{f_{i,c} \times f_{b,c}}.$$

In some embodiments, a value $f_c$ for the class c may be an arithmetic mean generated according to the following:

$$f_c = \frac{f_{i,c} + f_{b,c}}{2}.$$

In some embodiments, a value $f_c$ for the class c may be a harmonic mean generated according to the following:

$$f_c = \frac{2 f_{i,c} \times f_{b,c}}{f_{i,c} + f_{b,c}}.$$

In some embodiments, a value $f_c$ for the class c may be a quadratic mean generated according to the following:

$$f_c = \sqrt{\frac{f_{i,c}^2 + f_{b,c}^2}{2}}.$$

TABLE 2

| Class | # of images | # bounding boxes | $f_{i,c}$ | $f_{b,c}$ | $f_c$ |
|---|---|---|---|---|---|
| Person | 839 | 1674 | 0.3781 | 0.0704 | 0.1631 |
| Dump Truck | 1001 | 1215 | 0.4511 | 0.0511 | 0.1518 |
| Compactor | 456 | 503 | 0.2055 | 0.0212 | 0.0656 |
| Excavators | 1349 | 3145 | 0.6079 | 0.1323 | 0.2836 |
| Dozer | 665 | 748 | 0.2997 | 0.0315 | 0.0971 |
| Sprinkler | 349 | 390 | 0.1573 | 0.0164 | 0.0508 |
| Vehicle | 1178 | 3639 | 0.5309 | 0.1530 | 0.2850 |
| Pipes | 574 | 604 | 0.2587 | 0.0254 | 0.0811 |
| Color Cones | 987 | 10872 | 0.4448 | 0.4571 | 0.4511 |
| Bar | 90 | 176 | 0.0406 | 0.0074 | 0.0173 |
| Drum Cans | 2 | 2 | 0.0009 | 0.00008 | 0.0003 |
| Generator | 451 | 636 | 0.2032 | 0.0267 | 0.0737 |
| Survey Equipment | 116 | 176 | 0.0523 | 0.0074 | 0.0197 |
| Total # of Images | 2219 | | | | |
| Total # of Bounding Boxes | | 23780 | | | |

Table 2 shows the image factor $f_{i,c}$ and the box factor $f_{b,c}$ for each of the 13 classes shown in Table 1. Table 2 also shows an $f_c$ value for each class that is a geometric mean of the image factor $f_{i,c}$ and the box factor $f_{b,c}$. As illustrated in Table 2 the $f_c$ values in Table 2 generated for an I-RFS method are different than the $f_c$ values in Table 1 generated for a RFS method that is not instance-ware. Moreover, the $f_c$ values in Table 2 successfully denote color cones as the most frequent class, where the $f_c$ values in Table 1 denote excavator as the most frequent class.

The $f_c$ values generated in operation 408 may be used to sample an image set (e.g., image set 212) to generate a training set (e.g., training set 214) useful for training a classifier. In operation 410, the image set used in operation 408 to generate the $f_c$ values is sampled to generate a training set. In some embodiments, a class-level repeat factor $r_c$ may be generated for each class in a manner similar to the manner that a class-level repeat factor is generated in RFS. For example, in some embodiments, a class-level repeat factor $r_c$ is generated for each class c by substituting the $f_c$ values generated by an I-RFS method (e.g., method 400) for the $f_c$ values generated by an RFS method that is not instance-aware. For example, operation 408 may use a geometric mean to generate $f_c$ values and a class-level repeat factor may be generated for each class c according to the following:

$$r_c = \max\left(1, \sqrt{\frac{t}{\sqrt{f_{i,c} \times f_{b,c}}}}\right),$$

where $r_c$ is the class-level repeat factor for class c and t is a hyperparameter that is a threshold controlling a point at which oversampling begins. In some embodiments, the value of t is selected from the set {0, 0.1, 0.01, 0.001, 0.0001}. In some embodiments of method 400 a value of 0.001 for t achieves the best results.

In some embodiments, an image level repeat factor $r_i$ may be generated for each image i according to the following:

$$r_i = \max_{c \in i} r_c,$$

where {c∈i} denotes the classes present in image i. In some embodiments, $r_i$ may be increased if there are more objects from a rare class in an image. For example, an image level repeat factor $r_i$ may be generated for each image i according to the following:

$$r_i = \sqrt{a_c} \max_{c \in i} r_c,$$

where {c∈i} denotes the classes present in image i and where $a_c$ is the number of instances for the least frequent class in image i.

In some embodiments, the image level repeat factor $r_i$ may be used to determine how many times an image is used when training a classifier. In some embodiments, the value of $r_i$ is rounded up to the next integer. For example, a $r_i$ value of 2.1 or 2.7 would be rounded up to 3 to indicate that image i should be used 3 times when training a classifier. The training set generated (e.g., training set 214) may include copies of the images to be used multiple times or, to save memory or storage space, the training set may include a single copy of each image along with the number of times the image should be used in training. For example, a training set may comprise a set of images $\{i_1, i_2, i_2, i_2, i_3, i_3, \ldots, i_n\}$ (i.e., 3 copies of image $i_2$ and 2 copies of image $i_3$). The same training set may be stored as a set of tuples where each tuple is a copy of an image along with the number or times an image should be used during training. For example, the same training set could be stored as $\{(i_1, 1), (i_2, 3), (i_3, 2), \ldots, (i_n, 1)\}$ to show that image $i_2$ is used 3 times and image $i_3$ is used 2 times.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of sampling a set of images to create a training set of images for training a classifier, comprising:
   for each class c of an object to be classified by the classifier, generating a value $f_{i,c}$ that is the fraction of images in the set of images including at least one bounding box of class c;
   for each class c of the object to be classified by the classifier, generating a value $f_{b,c}$ that is the fraction of bounding boxes of class c in the set of images;
   for each class c of the object to be classified by the classifier, combining $f_{i,c}$ and $f_{b,c}$ to generate a value $f_c$; and
   sampling the set of images in accordance with the value $f_c$ to generate the training set of images.

2. The method according to claim 1, further comprising: training the classifier on the training set of images.

3. The method according to claim 1, wherein each image in the set of images is suitable for training the classifier.

4. The method of claim 1, wherein combining the values $f_{i,c}$ and $f_{b,c}$ includes generating a mean of the values $f_{i,c}$ and $f_{b,c}$.

5. The method according to claim 4, wherein the mean of the values $f_{i,c}$ and $f_{b,c}$ is a quadratic mean, an arithmetic mean, a geometric mean, or a harmonic mean.

6. The method according to claim 4, wherein the mean of the values $f_{i,c}$ and $f_{b,c}$ is a harmonic mean.

7. The method according to claim 1, wherein the training set includes a plurality of at least one of the images in the set of images.

8. The method according to claim 1, further comprising:
   for each class c, generating a class-level repeat factor in accordance with the value $f_c$; and
   for each image i, generating an image-level repeat factor in accordance with the value $f_c$,
   wherein sampling the set of images is performed in accordance with the class-level repeat factor and the image-level repeat factor.

9. The method according to claim 8, wherein the class-level repeat factor is generated according to the following:

$$r_c = \max\left(1, \sqrt{\frac{t}{f_c}}\right),$$

where $r_c$ is the class-level repeat factor for class c and t is a hyperparameter that is a threshold controlling a point at which oversampling begins.

10. The method of claim 9, wherein t is 0, 0.1, 0.01, 0.001, or 0.0001.

11. The method according to claim 9, wherein the image-level repeat factor is generated according to the following:

$$r_i = \max_{c \in i} r_c,$$

where $r_i$ is the image-level repeat factor for image i and where {c∈i} denotes the classes present in image i.

12. The method according to claim 9, wherein the image-level repeat factor is generated according to the following:

$$r_i = \sqrt{a_c} \max_{c \in i} r_c,$$

where $r_i$ is the image-level repeat factor for image i and where {c∈i} denotes the classes in image i and $\sqrt{a_c}$ denotes the number of instances in the image i from the class c.

13. The method of claim 1, further comprising:
   for each class c, generating a class-level repeat factor in accordance with the value $f_c$, wherein the class-level repeat factor is generated according to the following:

$$r_c = \max\left(1, \sqrt{\frac{t}{f_c}}\right),$$

where $r_c$ is the class-level repeat factor for class c and t is a hyperparameter that is a threshold controlling a point at which oversampling begins; and for each image i, generating an image-level repeat factor in accordance with the value $f_c$, wherein the image-level repeat factor is generated according to the following:

$$r_i = \max_{c \in i} r_c,$$

where $r_i$ is the image-level repeat factor for image i and where $\{c \in i\}$ denotes the classes present in image i,
  wherein sampling the set of images is performed in accordance with the class-level repeat factor and the image-level repeat factor, and
  wherein the training set includes a plurality of at least one of the images in the set of images.

14. The method of claim 12, wherein combining the values $f_{i,c}$ and $f_{b,c}$ includes generating a mean of the values $f_{i,c}$ and $f_{b,c}$.

15. The method according to claim 12, wherein the training set includes a plurality of at least one of the images in the set of images.

16. A non-transitory memory, comprising processor-executable instructions that when executed by one or more processors cause a system to perform operations for sampling a set of images to create a training set of images for training a classifier, the operations including:
  for each class c of an object to be classified by the classifier, generating a value $f_{i,c}$ that is the fraction of images in the set of images including at least one bounding box of class c;
  for each class c of the object to be classified by the classifier, generating a value $f_{b,c}$ that is the fraction of bounding boxes of class c in the set of images;
  for each class c of the object to be classified by the classifier, combining $f_{i,c}$ and $f_{b,c}$ to generate a value $f_c$; and
  sampling the set of images in accordance with the value $f_c$ to generate the training set of images.

17. The non-transitory memory of claim 16, wherein the training set includes a plurality of at least one of the images in the set of images.

18. The non-transitory memory of claim 16, wherein the operations further include:
  training the classifier on the training set of images.

19. A system, comprising:
  one or more processors; and
  memory communicatively connected to the one or more processors, the memory including processor-executable instructions that when executed by the one or more processors cause the system to perform operations for sampling a set of images to create a training set of images for training a classifier, the operations including:
  for each class c of an object to be classified by the classifier, generating a value $f_{i,c}$ that is the fraction of images in the set of images including at least one bounding box of class c;
  for each class c of the object to be classified by the classifier, generating a value $f_{b,c}$ that is the fraction of bounding boxes of class c in the set of images;
  for each class c of the object to be classified by the classifier, generating a value $f_c$ that is a mean of the values $f_{i,c}$ and $f_{b,c}$;
  for each class c, generating a class-level repeat factor in accordance with the value $f_c$, wherein the class-level repeat factor is generated according to the following:

$$r_c = \max\left(1, \sqrt{\frac{t}{f_c}}\right),$$

where $r_c$ is the class-level repeat factor for class c and t is a hyperparameter that is a threshold controlling a point at which oversampling begins;
  for each image i, generating an image-level repeat factor in accordance with the value $f_c$, wherein the image-level repeat factor is generated according to the following:

$$r_i = \max_{c \in i} r_c,$$

where $r_i$ is the image-level repeat factor for image i, where $\{c \in i\}$ denotes the classes present in image i, and where $a_c$ is the number of instances for the least frequent class in image i; and
  sampling the set of images in accordance with the class-level repeat factor and the image-level repeat factor to generate the training set of images, wherein the training set of images includes a plurality of at least one of the images in the set of images.

20. The system of claim 19, wherein the operations further include:
  training the classifier on the training set of images.

\* \* \* \* \*